Patented July 13, 1943

2,324,354

UNITED STATES PATENT OFFICE 2,324,354

WATER-SOLUBLE HIGH MOLECULAR ACYL-BIGUANIDE

Jakob Bindler and Hans Schläpfer, Basel, Switzerland, assignors to the firm of J. R. Geigy A. G., Basel, Switzerland No Drawing. Application January 2, 1941, Serial No. 372,904. In Switzerland December 21, 1939

6 Claims. (Cl. 260—401)

It has been found that water-insoluble high molecular acyl-biguanides of the following formula

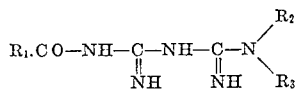

wherein $R_1$ means a high molecular aliphatic or alicyclic radical with 8 to 18 C-atoms and $R_2$ and $R_3$ mean hydrogen or aliphatic, araliphatic, alicyclic, aromatic, hydroaromatic or heterocyclic radicals which may also belong to the same ring system, or their derivatives which, instead of the hydrogen atoms in the above formula, are wholly or partially substituted at the basic N-atoms by alkyl- or aralkyl-radicals, can be converted into water-soluble derivatives if they are converted by means of acids into salts, by means of sulfonating agents into sulfonic acids or by means of partial or exhaustive alkylation and/or aralkylation into the quaternary ammonium compounds, or if both the latter principles are combined by partially or exhaustively alkylating and/or aralkylating the acyl-biguanides and subsequently sulfonating the same.

The high molecular acyl-biguanides may be obtained according to usual processes. It has been proved very suitable to start from the dicyandiamide, to acylate the latter with the carboxylic acids coming into question and to make from the so obtained acylated cyanguanidines of the general formula

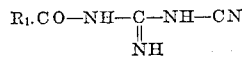

wherein $R_1$ has the same meaning as in the above formula, the acyl-biguanides by means of ammonia or organic bases or their salts respectively.

For the acylation which is carried out in usual manner—preferably in organic solvents such as chlorobenzene, nitrobenzene, pyridine, dimethylaniline and so on—high molecular aliphatic, alicyclic or hydroaromatic carboxylic acids which according to the definition must contain 9 to 19 carbon atoms or their functional derivatives come into consideration. There may be named the palmnut fatty acid, stearic acid, oleic acid, behenic acid, resin acid, alicyclic carboxylic acids such as for example campholic acid, naphthenic acid and so on.

The high molecular-substituted acyl-cyanguanidines may extremely readily be converted by means of ammonia, primary or secondary, saturated or unsaturated aliphatic, aliphatic-araliphatic, aliphatic-aromatic, aliphatic-hydroaromatic, araliphatic, araliphatic-aromatic, araliphatic hydroaromatic, aromatic, hydroaromatic and heterocyclic mono- or polyamines or their derivatives substituted by hydroxyl, -O-alkyl, halogen, -COOH, -$SO_3H$.

The addition of the bases or their salts respectively to the high molecular acylated cyanguanidines may be carried out in solvents or also directly, whereby there is preferably worked in presence of an indifferent gas such as $CO_2$, N and the like. The reaction usually takes place at temperatures above 100° C.

Derivatives which are partially or completely alkylated or aralkylated at the basic N-atoms can be made for instance by alkylating or aralkylating compounds which are suitable for producing biguanides; thus for example lauroyl cyanguanidine can simply be methylated and the compound so-obtained be converted into the methylated lauroyl phenyl biguanide by addition of aniline. But dicyandiamide can also be methylated with dimethyl sulfate and then be acylated. Furthermore intermediate products containing alkyl or aralkyl groups may also be used for the production of the acyl-biguanides, for example lauroyl cyanguanidine or methylated or otherwise alkylated derivatives thereof may be converted into the correspondingly substituted lauroyl biguanidines by means of methyl-, ethyl-, benzyl-aniline and the like.

The new condensation products, in so far as they contain hydrogen replaceable at nitrogen, may with alkylating and/or aralkylating means easily be alkylated or aralkylated up to the tertiary step and even be converted into water-soluble form by exhaustive alkylation and/or aralkylation with the usual alkylating, oxalkylating and aralkylating agents. With sulfonating agents such as sulfuric acid, oleum, chlorosulfonic acid, also in the presence of phosphorus chlorides, sulfur chlorides or organic solvents such as ether, pyridine, acetic acid anhydride and the like, the water-solubility may be realized. Both methods may be combined in any suitable manner.

The new compounds are particularly suitable for the manufacture of textile assistants, such as for example for stripping-off and levelling purposes in the vat-dyeing, or as softening agents, water-fastness improvers and the like. According to the choice of the high molecular radical they show also capillary-active effects which make them suitable for example as washing, levelling, dispersing and wetting agents. Some of the new compounds are also usable as excellent lime-soap emulgators and -solvents.

The invention is illustrated, but not limited, by the following examples, the parts being by weight unless otherwise stated.

Example 1

60 parts of dicyandiamide are suspended in 150 parts of chlorobenzene and a solution of 77 parts of palmnut fatty acid chloride in 50 parts of chlorobenzene is added thereto drop by drop at 70° C. Then there is slowly heated up to 120° C. and the whole is kept at this temperature. First the solution becomes weakly yellow, but with the progress of the condensation the color becomes more and more intensive and turns at the end to orange-red. The reaction being completed, i. e. after about 24 hours, there is distilled with steam and the condensation product is filtered off. It is cold pasted with a sodium carbonate solution, boiled out with water after filtering off and is finally dried. The orange-yellow powder of melting point 132–138° C. is difficultly soluble in alcohol, ether and the like, but easily soluble in pyridine and glacial acetic acid.

N: calculated, 21.0 per cent; found, 20.6 per cent.

28 parts of lauroyl cyanguanidine are heated, preferably in a $CO_2$-atmosphere, with 40 parts of aniline at 140–150° C. for 18 hours. The color being at the beginning orange-yellow to orange-red changes during the progress of the reaction into light-yellow. The addition being completed, the condensation product is freed from exceeding aniline by means of steam and is dried. The lauroyl phenyl biguanide forms a solid, light-yellow waxy mass which is preferably dissolved in alcohol for purifying purposes and again precipitated with water.

37.5 parts of lauroyl phenyl biguanide are dissolved in 300 parts of chlorobenzene, intermixed with 38 parts of dimethyl sulfate and 32 parts of anhydrous sodium carbonate and methylated for 6 hours at 100–110° C. Finally the inorganic salts are filtered off and the chlorobenzene is distilled off in vacuo. There remains the tertiary base as a light-brown fatty mass which is clearly soluble in acids when strongly diluted.

20 parts of the said methylated lauroyl phenyl biguanide are dissolved in 40 parts of monohydrate and 20 parts of oleum of 26% strength are added thereto at 0–10° C. As soon as all is dropped in, there is stirred at 20–30° C. until solubility in soda is reached. When this is the case, the whole is poured on ice-water whereby the new sulfonic acid separates out. The latter is filtered off, neutralised with caustic soda lye and the sodium salt is evaporated to dryness. Thus there is obtained a greyish-white powder which is clearly soluble in water. The new compound is especially suitable for levelling and stripping-off purposes in the vat-dyeing.

If there is sulfonated under the same conditions with a greater quantity of sulfonating agent, the final product, besides the stripping-off property for vat-dyestuffs, possesses also an excellent lime-soap dispersing effect.

Instead of palmnut fatty acid chloride there may be used the corresponding bromide or the free acid itself, or also other fatty acids such as for example the capric acid, oleic acid, palmitic acid, fish-oil fatty acid and the like.

Instead of aniline there may also be used monomethyl- or -ethylaniline, p-chloraniline, m- or p-toluidine, p-aminodimethyl- or -diethylaniline, benzylaniline, o- or m-phenylenediamine, but also hydrogenized compounds such as cyclohexylamine, methyl- or benzylcyclohexylamine, aminotetraline and so on.

The reactions involved in this example may be represented as follows for the situation involving the use of palmnut fatty acid chloride and aniline:

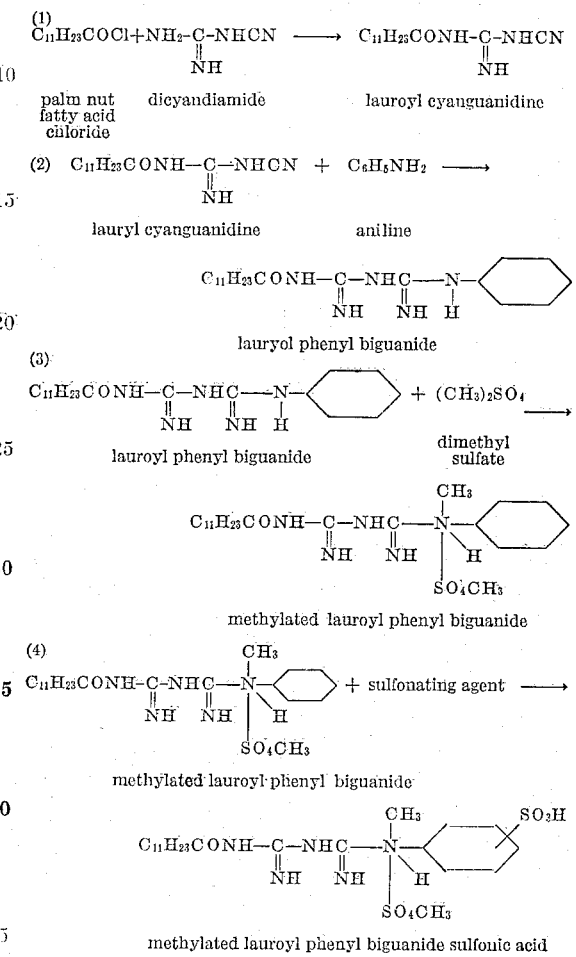

Example 2

28 parts of lauroyl cyanguanidine are heated with 40 parts of o-toluidine in a $CO_2$-atmosphere for 18 hours at 140–150° C. By distillation with steam the condensation product is freed from the excess of o-toluidine and is then dried.

The lauroyl-o-tolylbiguanide forms a semi-solid mass which solidifies when being allowed to stand.

31 parts of lauroyl-o-tolylbiguanide are dissolved in 350 parts of chlorobenzene, then 30 parts of anhydrous sodium carbonate and 35 parts of dimethyl sulfate are added thereto and the whole is methylated for 6 hours at 100–110° C. After separation of the inorganic salts the solvent is distilled off in vacuo. There remains a light-brown fatty mass which is soluble in acids.

28 parts of this methylated lauroyl tolyl biguanide are dissolved in 56 parts of sulfuric acid monohydrate, whereupon 20 parts of oleum of 26 per cent strength are added thereto at 0–10° C., the whole being sulfonated according to Example 1 and worked up. Finally there is obtained a grey-white powder which is clearly soluble in water and possesses similar properties to the product obtained according to Example 1.

Example 3

21 parts of lauroyl cyanguanidine are heated up to 140° C. (CO$_2$-atmosphere) for 18 hours with 40 parts of p-anisidine and the condensation product thus obtained is then freed in usual manner from the exceeding base.

24 parts of dry lauroyl-p-methoxyphenyl biguanide are dissolved in 400 parts of chlorobenzene, then intermixed with 22.5 parts of dimethyl sulfate and 13.5 parts of anhydrous sodium carbonate and kept at 100–110° C. for 6 hours. After removal of the inorganic salts and the solvent, there remains a light-brown fatty mass which is soluble in acids.

25 parts of the said methylated lauroyl-p-methoxyphenyl biguanide are dissolved in 50 parts of sulfuric acid monohydrate, sulfonated at 0–10° C. with 25 parts of oleum of 26 per cent strength and worked up according to Example 1. Thus a grey powder is obtained which is clearly soluble in water and possesses similar properties to the products described in the foregoing examples.

Example 4

21 parts of lauroyl cyanguanidine are heated for 18 hours up to 140–150° C. with 10.5 parts of o-phenetidine.

25 parts of the lauroyl-o-ethoxyphenyl biguanide worked up therefrom in the usual manner are methylated for 6 hours at 100–110° C. in 400 parts of chlorobenzene with 22.5 parts of dimethyl sulfate and the necessary quantity of sodium carbonate. After the usual working up there is obtained a dark fatty mass.

25 parts of this compound are sulfonated at 0–10° C. according to Example 1 in 150 parts of sulfuric acid monohydrate with 25 parts of oleum of 26 per cent strength. There remains finally a grey powder clearly soluble in water and having similar properties to those of the products of the foregoing examples.

Example 5

21 parts of lauroyl cyanguanidine are heated at 130–140° C. in a CO$_2$-atmosphere with 50 parts of p-phenetidine until the reaction is completed and the condensation product thus obtained is methylated in a chlorobenzene solution according to Example 1. From the methylated lauroyl-p-ethoxyphenyl biguanide isolated as usual there is obtained by sulfonation according to Example 1 a grey powder, which is clearly soluble in water and possesses similar properties.

Example 6

28 parts of lauroyl cyanguanidine are condensed for 18 hours at 130–140° C. with 10.5 parts of diethanolamine to a solid light-brown mass which becomes brittle after some time and can then easily be pulverized. The reaction product can be reprecipitated from diluted acids by means of alkalies.

38.5 parts of this lauroyl dihydroxyethyl biguanide are heated up to 90–95° C. with 19 parts of dimethyl sulfate (or with an excess of ethylene oxide) until water-solubility is reached. The new clearly water-soluble compound is obtained in form of a waxy mass. It is especially suitable for softening textiles.

Instead of dimethyl sulfate there may also be used diethyl sulfate. In the place of diethanolamine one may also use dimethyl- and -ethylamine, diallylamine, alcoholic ammonia, piperidine, morpholine, glycocoll, methyl- or ethylbenzylamine and the like.

Example 7

70 parts of lauroyl cyanguanidine are converted into lauroyl triamino triethylene-biguanide by heating with 38 parts of triethylene tetramine (for 18 hours at 140–150° C.). The resulting light-yellow and semi-solid mass is deliquescent at the air; it dissolves, when neutral, with strong opalescence, but, when acid, completely clearly in hot water.

42.6 parts of the said compound are mixed with 6 parts of acetic acid and evaporated to dryness. The acetate clearly soluble in water is suitable for making direct-dyeings fast to water. For this purpose, other salts such as for example the lactate, tartrate, malonate and the like can also be used.

Example 8

42.5 parts of lauroyl triamino triethylene biguanide after having been dissolved in 300 parts of chlorobenzene are alkylated with 32 parts of anhydrous sodium carbonate and 38 parts of dimethyl sulfate for 6 hours at 100–110° C. Inorganic salts as well as chlorobenzene are removed and 22.5 parts of the semi-solid fatty mass heated up to 80–90° C. with 6.5 parts of dimethyl sulfate until a complete solubility in water is reached. The quaternary compound thus obtained is especially suitable for softening textile fibres.

Example 9

60 parts of dicyandiamide are suspended in 150 parts of chlorobenzene and gradually intermixed at 70° C. with a solution of 101 parts of stearic acid chloride in 50 parts of chlorobenzene. Then there is slowly heated up to 120° C. and the mixture is kept at this temperature until the reaction is completed. Finally there is distilled with steam, the condensation product is several times extracted after the filtration with soda solution and subsequently hot with water and dried. The stearoyl cyanguanidine constitutes an orange-yellow powder which melts at 150–155° C. and which is difficultly soluble in alcohol, ether and the like, but easily soluble in pyridine and acetic acid.

35 parts of the said compound are well triturated with 70 parts of aniline salt and the whole is heated for 12 hours at 160–170° C. (in a CO$_2$-atmosphere). During proceeding of the reaction the color changes from reddish-yellow to light-brown. The chlorhydrate of the condensation product constitutes after boiling out with water and drying a brown brittle mass.

48 parts of stearoyl phenylbiguanide chlorhydrate yield after methylation in chlorobenzene, when heated for 6 hours up to 100–110° C. with 38 parts of dimethyl sulfate and 43 parts of anhydrous sodium carbonate, a semi-solid fatty mass which is soluble in acids.

20 parts of this compound are sulfonated in 40 parts of sulfuric acid monohydrate at the beginning at 0–10° C. and then at 20–30° C. with 20 parts of oleum of 26 per cent strength until solubility in sodium carbonate is obtained. The new sulfonic acid separates out when the sulfonation mass is poured on ice. It is filtered off, neutralised with caustic soda lye and the sodium salt is obtained by evaporating in form of a grey-white powder which is clearly soluble in water. It is a levelling and stripping agent for the vat-dyeing.

The new sulfonic acid corresponds to the formula

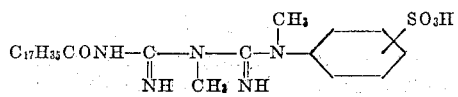

Instead of stearic acid one may also use campholic acid, naphthenic acid, resin acid and so on.

*Example 10*

By heating 35 parts of stearoyl cyanguanidine with 11 parts of monomethylaniline in a CO₂-atmosphere for 18 hours up to 140–150° C. there results the stearoyl-N-methylphenylbiguanide, which is a brown-yellow solid mass.

30 parts of the methylated compound obtained by methylation in the usual manner (45.7 parts of biguanide, 350 parts of chlorobenzene, 38 parts of dimethyl sulfate, 32 parts of anhydrous sodium carbonate, for 6 hours at 100–110° C.) are sulfonated in 60 parts of monohydrate with 30 parts of oleum of 26 per cent strength at 0–10° C. and worked up according to Example 9. The sodium salt is a light powder clearly soluble in water. Its properties are the same as those of the compound of Example 9.

*Example 11*

51 parts of stearoyl cyanguanidine are condensed with 17 parts of m-xylidine at 130–140° C. for 18 hours (in a CO₂-atmosphere) to a light yellow waxy mass.

20 parts of this stearoyl dimethyl phenylbiguanide are dissolved in 50 parts of monohydrate and sulfonated with the same quantity of oleum of 26 per cent strength at first at 0–10° C. and then for 5–6 hours at 20–30° C. Then a test should be completely and clearly soluble in sodium carbonate. The sulfonation mass is now poured on water and the separated sulfonic acid is decanted from the dilute sulfuric acid. The sodium salt of the new sulfonic acid is clearly soluble in water and constitutes a bright powder which can be used as lime-soap solvent or dispersing agent as well as washing agent.

The new sulfonic acid corresponds to the formula

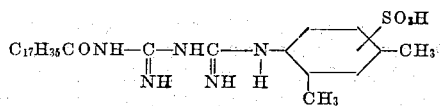

*Example 12*

35 parts of stearoyl cyanguanidine are condensed at 130–140° C. with 6.5 parts of monoethanolamine to a light-yellow, easily pulverisable mass.

N: calculated, 17 per cent; found, 17.6 per cent.

41 parts of the said stearoyl hydroxyethylbiguanide are alkylated in 400 parts of chlorobenzene with 38 parts of dimethyl sulfate and the necessary quantity of sodium carbonate (temperature 100–110° C.).

20 parts of the solid waxy mass obtained in the usual manner are sulfonated for 2 hours at 0–10° C. and for further 5 hours at 20–30° C. in 100 parts of a mixture consisting of equal parts of chlorosulfonic acid and sulfuric acid monohydrate. The sulfonation mixture is worked up in usual manner. The sodium salt of the sulfonic acid (which probably contains the sulfonic acid group completely or partially bound in form of an ester) constitutes a grey-white powder of good water-solubility. It possesses a strong wetting effect.

Instead of monoethanolamine ethyl-, propyl- or butylamine may also be used in the above example.

*Example 13*

45 parts of the methylated stearoyl hydroxyethylbiguanide obtained according to Example 12 are heated at 90–95° C. with 19 parts of dimethyl sulfate (or chloromethyl) until water-solubility is reached. The quaternary compound is obtained as a solid waxy mass which is very suitable for softening textiles.

The new quaternary compound corresponds to the formula

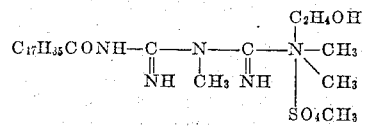

*Example 14*

71.5 parts of stearoyl cyanguanidine are caused to react during 18 hours at a temperature of 130–140° C. with 29.5 parts of triethylene tetramine to form a light-yellow solid, waxy, pulverisable mass. The new compound is clearly soluble in acids and is then again precipitated out by means of alkalies.

10 parts of the stearoyl triamino triethylene biguanide thus obtained are evaporated to dryness with 4.5 parts of citric acid. The citrate is a bright powder which clearly dissolves in water and which may be used as water-fastness improver for direct-dyeings and as softener for native and regenerated cellulose fibres.

*Example 15*

30 parts of the biguanide obtained according to Example 14 are methylated in 300 parts of chlorobenzene with 22.5 parts of dimethyl sulfate and the necessary quantity of sodium carbonate for 6 hours at 100–110° C. After the usual working up there is obtained a semi-solid mass which is soluble in acids.

17 parts of this compound are heated with 5 parts of dimethyl sulfate until water-solubility is reached. The new quaternary compound is especially suitable for the use as softening agent for textiles.

*Example 16*

17 parts of the methylated tertiary biguanide made according to Example 15 are heated for about 9 hours with 5 parts of benzyl chloride up to 90° C. The waxy mass thus obtained is also very suitable for softening textiles.

*Example 17*

71.5 parts of stearoyl cyanguanidine and 16 parts of ethylene diamine after having been heated for 18 hours up to 130–140° C. in the stirring autoclave give a solid mass difficultly soluble in acids. 33 parts of the product thus obtained are dissolved in chlorobenzene, then intermixed with 25.5 parts of anhydrous sodium carbonate and 35 parts of dimethyl sulfate and the whole is treated for 6 hours at 100–110° C. The working up is the usual one.

From 16.5 parts of this methylated product there results after a treatment for 12 hours at 90° C. with 5.5 parts of dimethyl sulfate a solid waxy mass which is especially suitable for softening textiles.

Example 18

175 parts of stearoyl cyanguanidine made by heating stearic acid and dicyandiamide are suspended in 600 parts by volume of chlorobenzene, then mixed at 40–50° C. with 126 parts of dimethyl sulfate and 106 parts of anhydrous sodium carbonate and the whole mixture is methylated for 16 hours at 110–120° C. Then the inorganic salts are hot filtered off and the chlorobenzene is distilled off in vacuo. There remains a light yellow waxy mass which can be converted into a water-soluble compound according to Example 1. But one can also proceed as follows:

92 parts of the methylated stearoyl cyanguanidine are heated under $CO_2$ for 15 hours with 16 parts of monoethanol amine up to 130–140° C. There results a yellow waxy mass.

42 parts of the methylated stearoyl hydroxyethyl-biguanide thus produced are heated at 90–95° C. with 28 parts of dimethyl sulfate until water-solubility is reached. The quaternary compound thus obtained is especially suitable for softening textiles.

Example 19

140 parts of lauroyl cyanguanidine made from palmnut fatty acid and dicyandiamide are suspended in 600 parts by volume of chlorobenzene, then 126 parts of dimethyl sulfate and 106 parts of anhydrous sodium carbonate are added thereto at 40–50° C. and methylated for 16 hours at 110–120° C. The working up is carried out as in Example 18. The further working up can also take place in the following manner:

30.5 parts of this methylated lauroyl cyanguanidine are heated for 18 hours up to 140° C. (in a $CO_2$-atmosphere) with 10 parts of aniline. There results a waxy brownish mass.

30 parts of this condensation product are dissolved in 60 parts of monohydrate and 30 parts of oleum of 26 per cent strength are added thereto at 0–10° C. As soon as all thereof is dropped thereinto, stirring is continued at 20–30° C. until the mixture is completely soluble in sodium carbonate. Then there is poured on ice-water, the sulfonic acid separated out is filtered off, neutralized with caustic soda lye and the sodium salt is evaporated to dryness. Thus a light-yellow powder is obtained which is suitable for levelling and stripping purposes in the vat-dyeing.

Example 20

80 parts of stearoyl cyanguanidine methylated and obtained according to Example 18 are heated for 18 hours in a $CO_2$-atmosphere up to 130–140° C. with 24 parts of monomethylaniline. The condensation product forms a semi-solid mass which solidifies when it is allowed to stand.

30 parts of the said methylated acylbiguanide compound are dissolved in 60 parts of monohydrate, then sulfonated at 0–10° C. with 30 parts of oleum of 26 per cent strength according to Example 19, whereupon the sulfonation product is worked up. A light yellow powder possessing similar properties is obtained.

Instead of the fatty acids used in the above examples there may also be used other ones such as for example myristic acid or fatty acid mixtures of the trade different from that named above or the compounds cited in this specification. Furthermore, for alkylation or aralkylation the other technically available agents are very suitable, such as for instance diethyl sulfate, ethylene oxide, methyl chloride, toluene sulfonic acid alkyl esters and the like. Besides ammonia the following bases which can also be used may be enumerated: dimethyl amine, propyl amine, butyl amine, diallyl amine, cyclohexyl amine, benzyl amine, p-aminodimethyl- and -ethyl aniline, o- and m-phenylene diamine, piperidine, morpholine and so on. The above enumerations may only serve as a further illustration of the examples and by no means limit the scope of the present invention in any manner to the said compounds.

What we claim is:

1. The high molecular acyl-biguanides of the formula $$R_1.CO.NH-\underset{\underset{NH}{\|}}{C}-NX-\underset{\underset{NH}{\|}}{C}-N\diagup^{R_2}_{R_3}$$

wherein X represents a member of the group consisting of H, alkyl and aralkyl, $R_1$ means a high molecular radical selected from the group consisting of alkyl and cycloalkyl radicals containing 8 to 18 C-atoms, and $R_2$ and $R_3$ mean members of the group consisting of H, alkyl, aralkyl, cycloalkyl, aromatic, hydroaromatic and heterocyclic radicals.

2. The high molecular acyl-biguanides of the formula $$R_1.CO-NH-\underset{\underset{NH}{\|}}{\overset{alkyl}{C}}-\underset{\underset{NH}{\|}}{\overset{|}{N}}-C-N\diagup^{R_2}_{R_3}\diagdown_{SO_4alkyl}^{alkyl}$$

wherein $R_1$ means a high molecular radical selected from the group consisting of alkyl and cycloalkyl radicals containing 8 to 18 C-atoms, and $R_2$ and $R_3$ mean members of the group consisting of H, alkyl, aralkyl, cycloalkyl, aromatic, hydroaromatic and heterocyclic radicals.

3. The high molecular acyl-biguanides of the formula $$R_1.CO-NH-\underset{\underset{NH}{\|}}{C}-NX-\underset{\underset{NH}{\|}}{C}-NX-Ar-SO_3H$$

wherein $R_1$ means a high molecular radical selected from the group consisting of alkyl and cycloalkyl radicals containing 8 to 18 C-atoms, X means a member of the group consisting of H and alkyl and Ar means an aryl radical of the benzene series.

4. The high molecular acyl-biguanide of the formula $$C_{17}H_{35}CO-NH-\underset{\underset{NH}{\|}}{C}-\underset{\overset{|}{CH_3}}{N}-\underset{\underset{NH}{\|}}{C}-N\diagup^{C_2H_4OH}_{CH_3}\diagdown_{SO_4CH_3}^{CH_3}$$

5. The high molecular acyl-biguanide of the formula $$C_{17}H_{35}.CO-NH-\underset{\underset{NH}{\|}}{C}-\underset{\overset{|}{CH_3}}{N}-\underset{\underset{NH}{\|}}{C}-N\diagup^{CH_3}_{\text{—phenyl-}SO_3H}$$

6. The high molecular acyl-biguanide of the formula $$C_{17}H_{35}.CO-NH-\underset{\underset{NH}{\|}}{C}-NH-\underset{\underset{NH}{\|}}{C}-NH-\text{(xylyl-}SO_3H\text{)}$$

JAKOB BINDLER.
HANS SCHLÄPFER.